March 29, 1949.　　K. HENRICKSEN ET AL　　2,465,804
EMERGENCY BRAKE CONTROL MECHANISM
FOR MOTOR VEHICLES
Filed May 6, 1947　　2 Sheets-Sheet 1
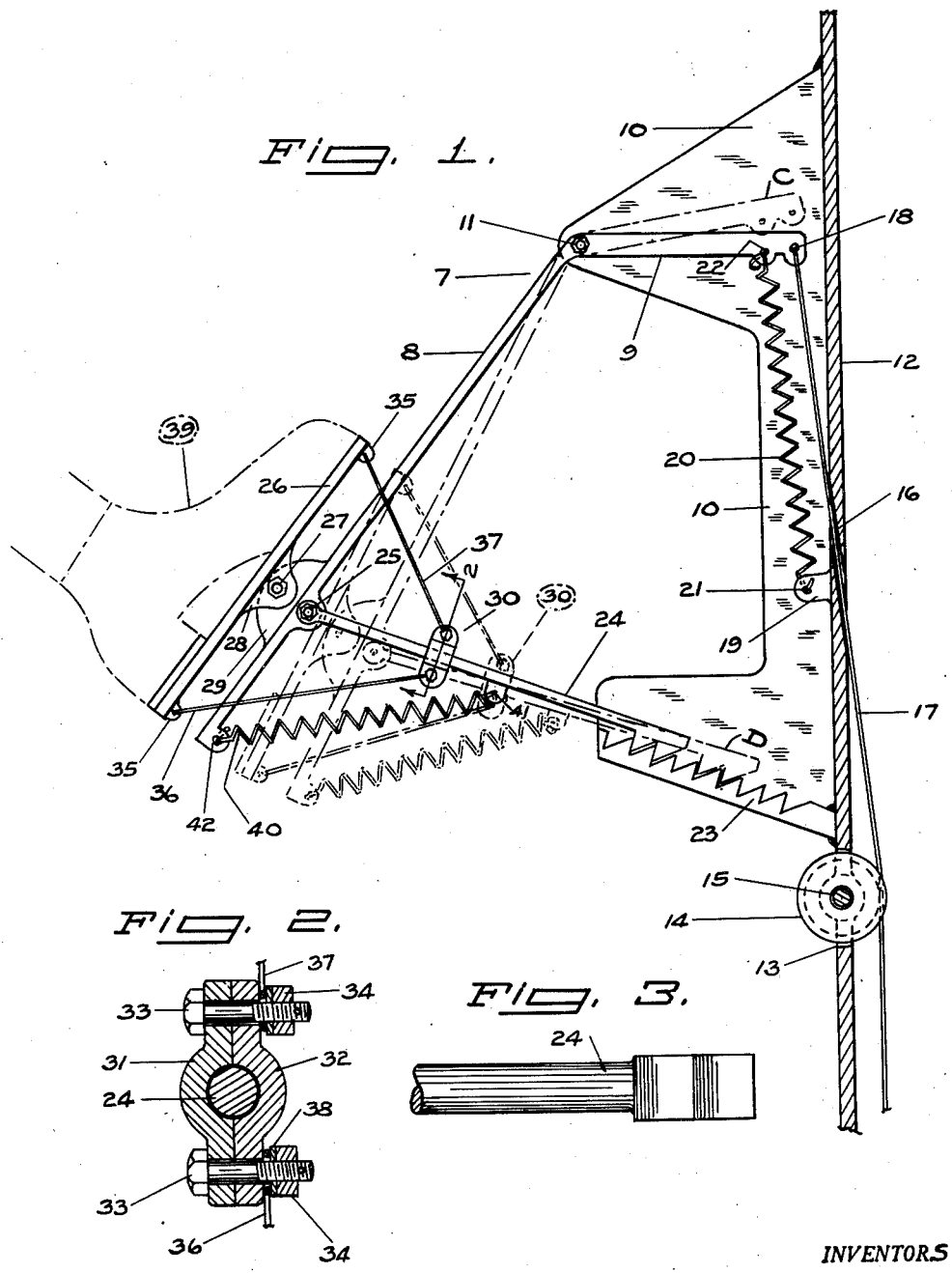
INVENTORS
KENNETH HENRICKSEN
WALTER P. HENRICKSEN
BY Edward C. Healy
ATTORNEY March 29, 1949.

K. HENRICKSEN ET AL
EMERGENCY BRAKE CONTROL MECHANISM
FOR MOTOR VEHICLES 2,465,804

Filed May 6, 1947

2 Sheets-Sheet 2

INVENTORS
KENNETH HENRICKSEN
WALTER P. HENRICKSEN
BY Edward C. Healy
ATTORNEY

Patented Mar. 29, 1949

2,465,804

UNITED STATES PATENT OFFICE 2,465,804

EMERGENCY BRAKE CONTROL MECHANISM FOR MOTOR VEHICLES

Kenneth Henricksen and Walter P. Henricksen, Petaluma, Calif.

Application May 6, 1947, Serial No. 746,266

1 Claim. (Cl. 74—512)

This invention relates to a new and useful improved emergency brake control mechanism for motor vehicles, such as automobiles, trucks and the like, and has particular reference to an especially constructed mechanism for use in combination with a conventional motor vehicle brake cable which control is adapted to be operated by the foot of the driver.

An object of the present invention is to provide an improved emergency brake pedal control that will automatically lock and which can be easily operated by the foot of the driver without bending forward, enabling both hands of the driver to be completely free.

Another object of the present invention is to pivotally connect the foot pedal to a pivotally supported brake lever and to pivotally connect a toothed lever to the said brake lever, which brake lever is engageable in a fixed toothed rack, whereby the said brake can be adjusted to different fixed positions by manipulating the foot pedal.

A further object of the present invention is to provide a plurality of spring members for resiliently controlling the brake lever and toothed lever.

A still further object of the present invention is to provide a bracket for securing the mechanism to the fire wall of the vehicle.

A still further object of the present invention is to provide a foot operative emergency brake control mechanism of the character described that is durable, simple in construction, economical to manufacture, positive in operation and highly efficient and serviceable in use.

Other objects and advantages will be apparent during the course of the following description.

Figure 4:
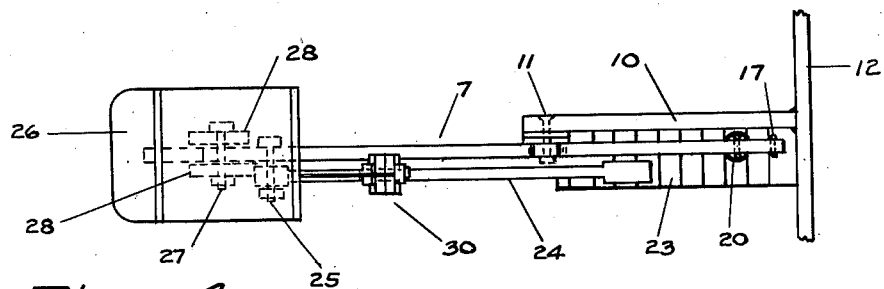
Figure 5:
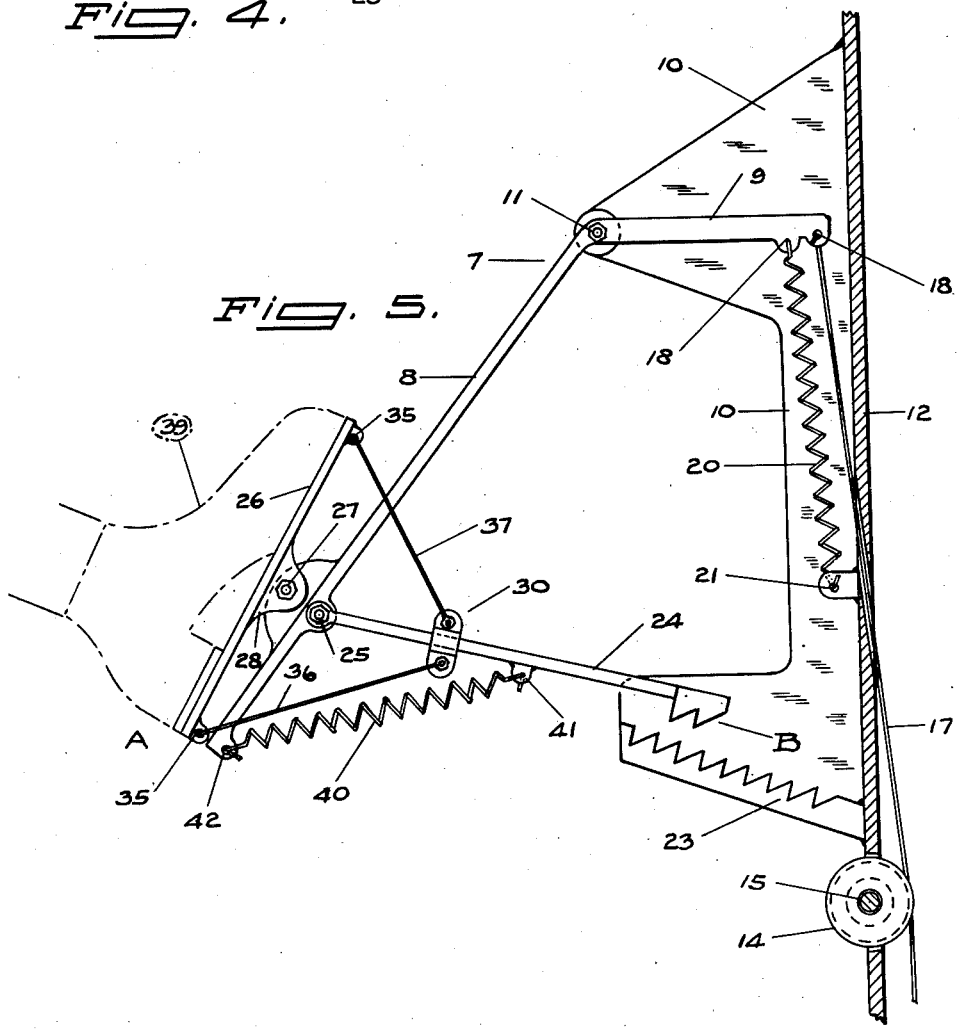

In the accompanying drawings forming a part of this specification, wherein for the purpose of illustration like numerals designate like parts throughout the same, Fig. 1 is a side elevational view of the emergency brake control mechanism shown supported on the fire wall of a motor vehicle, which fire wall is shown in section, Fig. 2 is a sectional view taken on line 2 of Fig. 1, illustrating a slide provided for unlocking the toothed lever employed in the invention, Fig. 3 is a fragmentary plan view of the toothed lever, Fig. 4 is a top plan view of the brake control mechanism, and Fig. 5 is a side elevational view of the control mechanism illustrating how the toothed lever is unlocked by manipulating the foot pedal.

Referring in detail to the drawings and to the numerals thereof, the numeral 7 designates the brake lever, as a whole, which lever comprises a downwardly extending portion 8 and a horizontal portion 9 and is pivotally secured to the bracket 10 as indicated at 11 in Fig. 1. The said bracket is welded or otherwise suitably secured to the fire wall 12 of the motor vehicle, which fire wall is apertured as at 13 for accommodating an idler pulley 14 that is pivotally secured thereto as at 15. An inclined elongated aperture 16 is formed through the fire wall 12 for accommodating a conventional brake cable 17, which cable is positioned over the idler pulley 14 and is secured to the outer end portion of the brake lever as at 18. A suitable lug 19 is welded to the fire wall and a coil spring 20 is secured to the said lug and to the brake lever as at 21 and 22, respectively, for resiliently retaining the brake lever in its normal position.

The preferred means for locking the said brake lever for retaining the same in its normal position, or operated positions, consists in the provision of a toothed rack 23, which rack is fixed to the bracket 10, and in the further providing of a toothed lever 24 that is engageable with the said rack and is pivotally secured to the brake lever, as at 25, illustrated to advantage in Figs. 1 and 5. A foot pedal 26 is pivotally secured to the brake lever through the medium of a suitable pin or bolt 27, suitable lugs 28 and 29 being provided on the foot pedal and brake lever, respectively, for accommodating the same.

One of the important features of the invention is the provision provided for operatively connecting the toothed lever 24 to the foot pedal. In Figs. 1 and 2 there is illustrated to advantage a slide member designated as a whole by the numeral 30 and formed in halves 31 and 32, which halves are secured one to the other by bolts and nuts 33 and 34, respectively. A pair of apertured lugs 35 are formed on the bottom of the foot pedal 26 and a pair of flexible cords 36 and 37 made of any suitable material, are secured to the said lugs and slide member for connecting the slide member to the foot pedal, the nuts 34 and lock washers 38 functioning to retain the said cords to the slide member.

From the foregoing description taken in conjunction with the accompanying drawings, it will be obvious that when the driver's foot, designated by the numeral 39 is tilted with the heel pressing downward as shown at A in Fig. 5, the flexible cord 37 secured to the foot pedal 26 will lift the slide 30 and toothed lever 24 unlocking the said lever from the rack 23 as shown at B in Fig. 5 unlocking the brake lever 8 and cable 17. When the said foot pedal is pressed downwardly as shown by the dot and dash lines in Fig. 1, the upper lever portion 9 will be tilted upwardly as shown at C tightening the brake cable 17 and thus operating the brake. The toothed bar 24 will be moved inwardly as indicated in dot and dash lines at D and can be retained in a locked position if desired. The amount of pressure applied on the brake can be varied by varying the foot pressure against the pedal. When the toothed bar is unlocked and the pressure is released the coil spring 40, secured to the toothed bar 24 and brake lever 8, as at 41 and 42 respectively, will pull the toothed bar back to its normal position and, likewise, the coil spring 20 will pull the brake lever back to its normal position, whereby the pulling force exerted on the brake cable 17 is released.

It is to be understood that the form of our invention herewith shown and described is to be taken as a preferred example of the same and that various changes relative to the shape, size, material and arrangement of parts may be resorted to without departing from the spirit of the invention or the scope of the sub-joined claim.

Having thus described our invention, we claim:

An emergency control brake control mechanism of the character described for motor vehicles, comprising a bracket fixed to the wall of the vehicle, an angularly shaped lever pivotally secured to the said bracket, said lever having an upper angular portion and a lower angular portion extending therefrom, a brake cable secured to the upper angular portion of the lever at the outer extremity thereof, a foot pedal pivotally connected to the lower angular portion, whereby the lever is capable of being manipulated by the foot of the driver to operate the cable and control the brake, a toothed rack fixed to the bracket and extending toward the lower angular portion of the lever and the foot pedal connected thereto, an elongated toothed bar pivotally connected at one end thereof to the lower angular portion of the lever, the opposite end of the bar being adapted to engage the toothed rack and adjustably lock the lever thereto, a slide member positioned on the toothed bar, an elongated flexible means extending from the opposite end portions of the slide member to the front and rear end portions of the foot pedal and connected thereto, whereby the toothed bar is raised and becomes disengaged from the rack when the foot pedal is tilted, a spring member for resiliently retaining the toothed bar in engagement with the rack, and a second spring for resiliently retaining the lever in its normal position.

KENNETH HENRICKSEN.
WALTER P. HENRICKSEN.

REFERENCES CITED

The following references are of record in the file of this patent:

UNITED STATES PATENTS

| Number | Name | Date |
|---|---|---|
| 669,475 | Bullard | Mar. 5, 1901 |
| 694,393 | Larson | Mar. 4, 1902 |
| 1,614,289 | Dominguez | Jan. 11, 1927 |